United States Patent
Sadakane

(10) Patent No.: US 12,500,266 B2
(45) Date of Patent: Dec. 16, 2025

(54) LITHIUM SECONDARY BATTERY

(71) Applicant: Panasonic Intellectual Property Management Co., Ltd., Osaka (JP)

(72) Inventor: Takuya Sadakane, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1204 days.

(21) Appl. No.: 16/979,612

(22) PCT Filed: Feb. 13, 2019

(86) PCT No.: PCT/JP2019/004947
§ 371 (c)(1),
(2) Date: Sep. 10, 2020

(87) PCT Pub. No.: WO2019/181278
PCT Pub. Date: Sep. 26, 2019

(65) Prior Publication Data
US 2021/0043970 A1    Feb. 11, 2021

(30) Foreign Application Priority Data
Mar. 23, 2018  (JP) ................................ 2018-057011

(51) Int. Cl.
*H01M 10/0565*  (2010.01)
*H01M 4/525*  (2010.01)
(Continued)

(52) U.S. Cl.
CPC ....... *H01M 10/0565* (2013.01); *H01M 4/525* (2013.01); *H01M 4/661* (2013.01);
(Continued)

(58) Field of Classification Search
None
See application file for complete search history.

(56) References Cited

U.S. PATENT DOCUMENTS 7,172,834 B1 *   2/2007   Jow ................... H01M 10/0568
                                                                429/188
2003/0190530 A1   10/2003  Yang et al.
(Continued)

FOREIGN PATENT DOCUMENTS

CA    2783694 A1    6/2011
CN    102656735 A   9/2012
(Continued)

OTHER PUBLICATIONS

The Extended European Search Report dated Apr. 20, 2021, issued in counterpart Application No. 19770878.7. (7 pages).
(Continued)

*Primary Examiner* — Amanda J Barrow
(74) *Attorney, Agent, or Firm* — WHDA, LLP

(57) ABSTRACT

A lithium secondary battery having a positive electrode, a separator, a negative electrode facing the positive electrode with the separator interposed therebetween, and an electrolyte, in which metallic lithium deposits on the negative electrode during charge. The electrolyte includes: an oxalate salt containing an oxalate complex as an anion, and a lithium ion as a cation; and a polycyclic compound having a thiazole ring and an aromatic ring sharing one side with the thiazole ring.

5 Claims, 1 Drawing Sheet

(51) Int. Cl.
    *H01M 4/66*    (2006.01)
    *H01M 10/0525*    (2010.01)
    *H01M 10/0567*    (2010.01)
    *H01M 4/02*    (2006.01)
(52) U.S. Cl.
    CPC ... *H01M 10/0525* (2013.01); *H01M 10/0567* (2013.01); *H01M 2004/028* (2013.01); *H01M 2300/0025* (2013.01)

(56)  References Cited

U.S. PATENT DOCUMENTS

| | | |
|---|---|---|
| 2011/0143220 A1 | 6/2011 | Steimle et al. |
| 2013/0216919 A1* | 8/2013 | Tokuda ............ H01M 10/4235 429/329 |
| 2014/0093783 A1* | 4/2014 | Lamanna ......... H01M 10/0565 429/188 |
| 2015/0083604 A1* | 3/2015 | Steimle ............ H01M 10/0567 205/261 |
| 2015/0221977 A1* | 8/2015 | Hallac .............. H01M 10/0567 429/163 |
| 2015/0311563 A1 | 10/2015 | Abe et al. |
| 2016/0172660 A1* | 6/2016 | Fischer ............... H01M 4/1395 429/188 |
| 2016/0365576 A1* | 12/2016 | Eguchi ................. H01M 4/525 |

FOREIGN PATENT DOCUMENTS

| | | | |
|---|---|---|---|
| CN | 105047910 A | 11/2015 | |
| CN | 106099194 * | 11/2016 | ........ H01M 10/0569 |
| EP | 3316361 A1 | 5/2018 | |
| JP | 2001-250559 A | 9/2001 | |
| JP | 2001-273927 A | 10/2001 | |
| JP | 2013-513923 A | 4/2013 | |
| JP | 2018-501615 A | 1/2018 | |
| WO | 2016/094750 A1 | 6/2016 | |

OTHER PUBLICATIONS

International Search Report dated May 7, 2019, issued in counterpart International Application No. PCT/JP2019/004947. (2 pages).

English Translation of Chinese Search Report dated Apr. 1, 2024, issued in counterpart CN application No. 201980019980.0. (2 pages).

English Translation of Chinese Search Report dated Nov. 23, 2023, issued in counterpart CN application No. 201980019980.0. (3 pages).

* cited by examiner

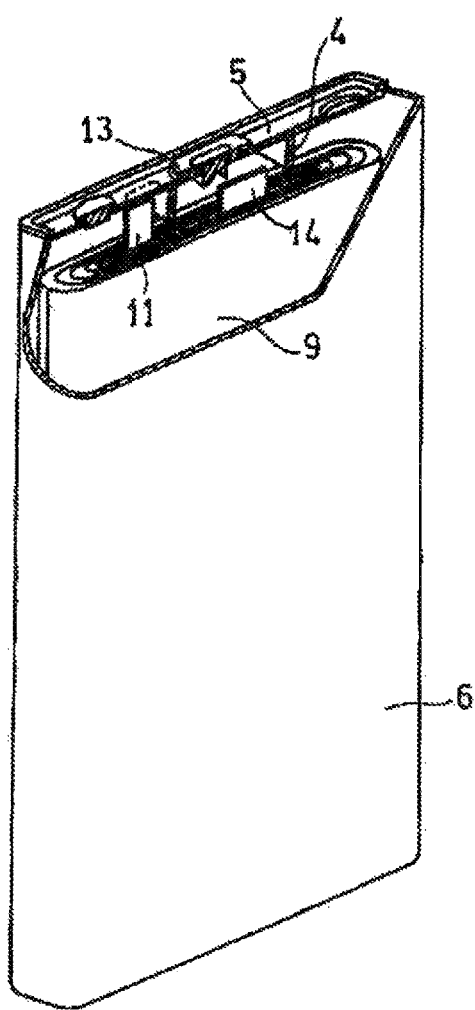

LITHIUM SECONDARY BATTERY

TECHNICAL FIELD

The present invention relates to a lithium secondary battery including lithium metal as a negative electrode active material.

BACKGROUND ART

Non-aqueous electrolyte secondary batteries have been widely used for ICT devices, such as personal computers and smart phones, automobiles, power storage systems, and other applications. For the non-aqueous electrolyte secondary batteries used for such applications, further improvement in their capacity has been required. A lithium ion battery is known as a high-capacity non-aqueous electrolyte secondary battery. The capacity of the lithium ion battery can be further improved by using, for example, graphite and an alloy-type active material, such as a silicon compound, in combination as negative electrode active materials. However, the improvement in capacity of the lithium ion battery is approaching to the limit.

A lithium secondary battery is seen as promising as a non-aqueous electrolyte secondary battery superior in capacity to the lithium ion battery In the lithium secondary battery metallic lithium deposits on the negative electrode during charge, and the metallic lithium dissolves in the electrolyte during discharge. Patent Literature 1, which relates to a secondary battery including an anode containing lithium metal, proposes using an electrolyte containing an oxalate complex as an anion.

CITATION LIST

Patent Literature

[PTL 1] Japanese Laid-Open Patent Publication No. 2018-501615

SUMMARY OF INVENTION

According to Patent Literature 1, the capacity attenuation associated with cycling operations can be suppressed. The suppression, however, is not sufficient.

One aspect of the present invention relates to a lithium secondary battery having a positive electrode, a separator, a negative electrode facing the positive electrode with the separator interposed between the negative electrode and the positive electrode, and an electrolyte, wherein metallic lithium deposits on the negative electrode during charge, the electrolyte including: an oxalate salt containing an oxalate complex as an anion, and a lithium ion as a cation; and a polycyclic compound having a thiazole ring and an aromatic ring sharing one side with the thiazole ring.

The lithium secondary battery of the present invention has excellent cycle characteristics.

BRIEF DESCRIPTION OF DRAWING

[FIG. 1] A partially cut-away schematic oblique view of a lithium secondary battery according to one embodiment of the present invention.

DESCRIPTION OF EMBODIMENTS

A lithium secondary battery according to the present embodiment has a positive electrode, a separator, a negative electrode facing the positive electrode with the separator interposed therebetween, and an electrolyte. Metallic lithium deposits on the negative electrode during charge. The deposited metallic lithium on the negative electrode dissolves in the form of lithium ions in the electrolyte during discharge.

In a typical lithium secondary battery metallic lithium tends to deposit in a dendrite form on the negative electrode. This increases side reactions, which reduces the charge-discharge efficiency, and deteriorates the cycle characteristics. When the electrolyte includes an oxalate salt containing an oxalate complex as an anion and a lithium ion as a cation, the oxalate complex serving as the anion interacts with lithium, allowing metallic lithium to uniformly deposit in a fine particulate form. Accordingly the formation of dendrites tends to be suppressed.

It has been revealed, however, that the oxalate salt prompts deterioration of the positive electrode. Although it is unclear by what mechanism this occurs, oxalic acid produced by decomposition of the oxalate salt is considered to cause the positive electrode to deteriorate. Especially when the positive electrode active material is a nickel (Ni)-containing composite oxide having a layered rock-salt structure, the positive electrode is more likely to deteriorate.

The inventors have found that the deterioration of the positive electrode due to the oxalate salt can be suppressed by the addition of a thiazole compound having a specific structure. The thiazole compound that can serve to suppress the deterioration of a positive electrode is a polycyclic compound having a thiazole ring and an aromatic ring sharing one side with the thiazole ring (hereinafter sometimes referred to as a polycyclic thiazole compound). It is also still unclear by what mechanism the polycyclic thiazole compound can suppress the deterioration of the positive electrode due to the oxalate salt. For example, in association with charge and discharge of the lithium secondary battery, a coating film called SEI (Solid Electrolyte Interphase) is formed on the negative electrode surface, from decomposition products of the components of the electrolyte. The SEI film thus formed contains the polycyclic thiazole compound or its decomposition products. This is presumably a reason why excessive decomposition of the oxalate salt can be suppressed. This suppress the production of oxalic acid, leading to suppressed deterioration of the positive electrode.

Specifically, in the present embodiment, the electrolyte includes an oxalate salt and a polycyclic thiazole compound. This can suppress the deterioration of the positive electrode, while suppressing the formation of dendrites on the negative electrode. Consequently, the charge-discharge efficiency can be improved, and the cycle characteristics can also be improved.

(Oxalate Salt)

The oxalate salt contains an oxalate complex as an anion and a lithium ion as a cation.

The oxalate salt is not limited, and may contain, for example, at least one of boron (B) and phosphorus (P). Examples of the oxalate salt include lithium difluorooxalate borate ($LiBF_2(C_2O_4)$, LiFOB), lithium bisoxalate borate ($LiB(C_2O_4)_2$, LiBOB), $LiB(CN)_2(C_2O_4)$, $LiPF_4(C_2O_4)$, and $LiPF_2(C_2O_4)_2$. For effectively suppressing the formation of dendrites, the oxalate salt may be LiFOB.

The oxalate salt is contained in the electrolyte at a concentration of preferably 1 mass % or more and 20 mass % or less (0.1 mol/L or more and 2 mol/L or less), more preferably 3 mass % or more and 10 mass % or less, particularly preferably 3 mass % or more and 8 mass % or less. When the concentration of the oxalate salt is in this range, metallic lithium is more unlikely to deposit in a dendrite form.

(Polycyclic Thiazole Compound)

The polycyclic thiazole compound has a thiazole ring and an aromatic ring sharing one side with the thiazole ring.

The aromatic ring is not limited. For example, the aromatic ring may be an aromatic hydrocarbon of a 6- or more-membered carbon ring, such as benzene ring, or a 5- or more-membered heterocycle containing a nitrogen, an oxygen, a sulfur atom or the like, in addition to carbon atoms. Among them, a benzene ring is preferable.

Specific examples of the polycyclic thiazole compound include a benzothiazole and a derivative thereof They may be used singly or in combination of two or more kinds. Examples of the derivative include a compound in which an aliphatic hydrocarbon group (e.g., a C1-C4 saturated hydrocarbon group or unsaturated hydrocarbon group), an aromatic hydrocarbon group, a mercapto group, a halogen element, a hydroxy group, an alkoxy group, or an amino group is bonded to the thiazole ring at the 2-position or the aromatic ring. A preferable benzothiazole derivative is a compound in which a C1 or C2 aliphatic hydrocarbon group is bonded to the thiazole ring at the 2-position (e.g., 2-methylbenzothiazole).

The polycyclic thiazole compound is contained in the electrolyte at a concentration of, preferably 0.1 mass % or more and 5 mass % or less, more preferably 0.5 mass % or more and 3 mass % or less, particularly preferably 0.8 mass % or more and 1.5 mass % or less. When the concentration of the polycyclic thiazole compound is within the range above, the deterioration of the positive electrode due to the oxalate salt is more likely to be suppressed.

The oxalate salt and the polycyclic thiazole compound may be contained in any mass ratio in the electrolyte. In view of suppressing the formation of dendrites due to the oxalate salt and suppressing the deterioration of the positive electrode, the mass ratio of the polycyclic thiazole compound to the oxalate salt in the electrolyte, i.e., the polycyclic thiazole compound/the oxalate salt, is preferably 0.02 to 2, more preferably 0.1 to 1, particularly preferably 0.1 to 0.5.

A detailed description will be given below of a lithium secondary battery according to an embodiment of the present invention. The lithium secondary battery includes, for example, a negative electrode, a separator, a positive electrode, and an electrolyte as described below

[Negative Electrode]

The negative electrode is an electrode on which metallic lithium deposits during charge. The deposited metallic lithium is derived from lithium ions in the electrolyte, and dissolves in the electrolyte again during discharge. The lithium ions present in the electrolyte may be either derived from a lithium salt added to the electrolyte or supplied from the positive electrode active material during charge, or both.

The negative electrode is composed of, for example, lithium metal and/or a lithium alloy. Alternatively, the negative electrode may include a negative electrode current collector composed of a metal material that does not react with metallic lithium. In this case, the negative electrode current collector may have a negative electrode active material layer containing lithium metal. The negative electrode active material layer can be formed by, for example, attaching a foil of lithium metal on the current collector, or electrodeposition or vapor deposition of lithium metal.

Note that, when the battery is in a fully discharged state, the negative electrode may have no lithium metal that can be substantially discharged. This makes the volume energy density of the battery increase. In other words, while including the negative electrode current collector, the negative electrode may not include the negative electrode active material layer in the fully discharged state. In this case, in the battery after discharge, the negative electrode is composed only of the negative electrode current collector, and when the battery is charged, metallic lithium becomes deposited on the surface of the negative electrode current collector, to form a negative electrode active material layer (lithium metal layer).

The fully discharged state of the battery is a state in which the lithium secondary battery has been discharged to the lower limit of a specified voltage range for the equipment to which the lithium secondary battery is applied. It can be checked in a manner as described below that, in the fully discharged state, the negative electrode has no lithium metal that can be substantially discharged. For example, the lithium secondary battery in the frilly discharged state is disassembled, to take out the negative electrode, which is then washed with a non-aqueous solvent, such as an ester, and dried. The obtained negative electrode is used in combination with lithium metal serving as a counter electrode, to fabricate a test battery. When discharging of the negative electrode is impossible, the negative electrode can be regarded as being in the fully discharged state.

Examples of the metal material constituting the negative electrode current collector include copper (Cu), nickel (Ni), iron (Fe), and alloys containing these metal elements. Preferable examples of the alloys include a copper alloy and stainless steel (SUS). The metal material is preferably copper and/or a copper alloy, in view of its electrical conductivity. The content of copper in the negative electrode current collector is preferably 50 mass % or more, and may be 80 mass % or more. The metal material is, for example, in the form of foil. The negative electrode current collector may have any thickness, and is, for example, 5 μm to 20 μm in thickness.

[Positive Electrode]

The positive electrode includes, for example, a positive electrode collector, and a positive electrode mixture layer formed on a surface of the positive electrode current collector. The positive electrode mixture layer can be formed by applying a positive electrode slurry in which a positive electrode mixture containing a positive electrode active material, a binder, an electrically conductive agent, and the like is dispersed in a dispersion medium, to a surface of the positive electrode current collector and drying the slurry The dry coating film may be rolled, if necessary. The positive electrode mixture layer may be formed on one surface or both surfaces of the positive electrode current collector.

The positive electrode active material may be a composite oxide having a layered rock-salt structure. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aNi_bM_{1-b}O_c$, $Li_aMn_2O_4$, $Li_bMn_{2-b}O_4$, $LiMPO_4$, and $Li_2MPO_4F$ (M represents at least one selected from Na, Mg, Sc, Y, Mn, Fe, Co, Ni, Cu, Zn, Al, Cr, Pb, Sb, and B). Here, a=0 to 1.2, b=0 to 0.9, and c=2.0 to 2.3. Note that "a" representing the molar ratio of lithium is a value immediately after the preparation of the active material and is subjected to increase and decrease during charge and discharge.

Preferred among them is a nickel-containing composite oxide having a layered rock-salt structure. Examples thereof include $Li_aNi_bM_{1-b}O_2$ (M represents at least one selected from the group consisting of Mn, Co, and Al, and $0<a\leq1.2$, $0.3\leq b\leq1$). In view of achieving a higher capacity, more preferably, $0.85\leq b\leq1$. In view of the stability of the crystal structure, more prekrred is a lithium-nickel-cobalt-aluminum composite oxide (NCA) containing Co and Al as elements represented by M: $Li_aNi_bCo_cAl_dO_2$ ($0<a\leq1.2$, $0.85\leq b<1$, $0<c<0.15$, $0<d\leq0.1$, $b+c+d=1$). Specific examples of NCA include $LiNi_{0.8}Co_{0.15}Al_{0.05}O_2$, $LiNi_{0.8}Co_{0.18}Al_{0.02}O_2$, and $LiNi_{0.9}Co_{0.05}Al_{0.05}O_2$.

Specific examples of the nickel-containing composite oxide having a layered rock-salt structure, other than NCA, include a lithium-nickel-cobalt-manganese complex oxide (e.g., $LiNi_{0.5}Co_{0.2}Mn_{0.3}O_2$, $LiNi_{1/3}Co_{1/3}Mn_{1/3}O_2$, $LiNi_{0.4}Co_{0.2}Mn_{0.4}O_2$), a lithium-nickel-manganese composite oxide (e.g., $LiNi_{0.5}Mn_{0.5}O_2$), and a lithium-nickel-cobalt composite oxide (e.g., $LiNi_{0.8}Co_{0.2}O_2$).

The binder may be a resin material, examples of which include: fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; acrylic resin, such as polyacrylic acid, polymethyl acrylate, and ethylene-acrylic acid copolymer; vinyl resin, such as polyacrylonitrile and polyvinyl acetate; polyvinyl pyrrolidone; polyether sulfone; and a rubbery material, such as styrene-butadiene copolymer rubber (SBR). These may be used singly or in combination of two or more kinds.

Examples of the conductive agent include: graphite, such as natural graphite and artificial graphite; carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds.

The form and the thickness of the positive electrode current collector may be respectively selected from the forms and the ranges corresponding to those of the negative electrode current collector. The positive electrode current collector may be made of, for example, stainless steel, aluminum, an aluminum alloy, and titanium.

[Electrolyte]

The electrolyte includes a non-aqueous solvent, a lithium salt dissolved in the non-aqueous solvent, and the polycyclic thiazole compound as described above. The lithium salt includes the oxalate salt as described above.

A preferable concentration of the whole lithium salt including the oxalate salt in the electrolyte is, for example, 5 mass % or more and 20 mass % or less (0.5 mon or more and 2 mol/L or less). By controlling the concentration of the whole lithium salt within the above range, an electrolyte having excellent ion conductivity and moderate viscosity can be obtained. Note that the concentration of the whole lithium salt is not limited to the above.

Examples of the lithium salt, other than the oxalate salt, include: a lithium salt of a chlorine-containing acid (e.g., $LiClO_4$, $LiAlCl_4$, $LiB_{10}Cl_{10}$), a lithium salt of fluorine-containing acid (e.g., $LiPF_6$, $LiBF_4$, $LiSbF_6$, $LiAsF_6$, $LiCF_3SO_3$, $LiCF_3CO_2$), a lithium salt of fluorine-containing acid imide (e.g., $LiN(FSO_2)_2$, $LiN(CF_3SO_2)_2$, $LiN(CF_3SO_2)(C_4F_9SO_2)$, $LiN(C_2F_5SO_2)_2$), a lithium salt of fluorosulfonic acid (e.g., $LiSO_3F$), a lithium salt of monofluorophosphoric acid or difluorophosphoric acid (e.g., $LiPO_2F_2$), and lithium halide (e.g., LiCl, LiBr, LiI). These may be used singly or in combination of two or more kings. Preferred among them is $LiPF_6$. By using the oxalate salt and $LiPF_6$ in combination, a good-quality SEI film tends to be formed, and the production of oxalic acid is more likely to be suppressed.

When the lithium salt includes the oxalate salt and $LiPF_6$, the ratio of the oxalate salt to the total of the oxalate salt and $LiPF_6$ is preferably 10 mass % or more and 60 mass % or less, and more preferably 20 mass % or more and 40 mass % or less.

When the lithium salt includes another lithium salt, in addition to the oxalate salt and $LiPF_6$, the ratio of a total amount of the oxalate salt and $LiPF_6$ in the whole lithium salt is preferably 80 mass % or more, and more preferably 90 mass % or more. By controlling the ratio of the total amount of the oxalate salt and $LiPF_6$ in the whole lithium salt within the above range, a battery with excellent cycle characteristics tends to be obtained.

The non-aqueous solvent is not limited, examples of which include a cyclic carbonate, a chain carbonate, a cyclic carboxylic acid ester, a cyclic sulfone, a cyclic ether, and a chain ether. Examples of the cyclic carbonate include propylene carbonate and ethylene carbonate. Examples of the chain carbonate include diethyl carbonate, ethyl methyl carbonate (EMC), and dimethyl carbonate (DMC). Examples of the cyclic carboxylic acid ester include γ-butyrolactone and γ-valerolactone. Examples of the cyclic sulfone include sulfolane and methyl sulfolane. Examples of the cyclic ether include 1,3-dioxolane. Examples of the chain ether include 1,2-dimethoxy ethane and 1,2-diethoxyethane.

Among them, in view of improving the charge-discharge efficiency, a fluorine-containing cyclic carbonate is preferred. Examples of the fluorine-containing cyclic carbonate include fluoroethylene carbonate (FEC), difluoroethylene carbonate, and trifluoroethylene carbonate. For uniform distribution of the electrolyte over the negative electrode current collector, a chain carbonate is preferred, and DMC and EMC are more preferred.

The non-aqueous solvent is particularly preferably a mixed solvent of a fluorine-containing cyclic carbonate and a chain carbonate. The electrolyte particularly preferably includes: for example, a non-aqueous solvent containing FEC and EMC, and further containing DMC; the aforementioned polycyclic thiazole compound; and $LiPF_6$ and an oxalate salt in combination as an electrolyte salt.

[Separator]

The separator is interposed between the positive electrode and the negative electrode. The separator is excellent in ion permeability and has moderate mechanical strength and electrically insulating properties. The separator may be, for example, a macroporous thin film, a woven fabric, or a nonwoven fabric. The separator is preferably made of, for example, polyolefin, such as polypropylene or polyethylene.

[Lithium Secondary Battery]

A description will be given below of the configuration of a lithium secondary battery according to the present embodiment, with reference to the drawings. FIG. 1 is a partially cut-away schematic oblique view of a prismatic lithium secondary battery according to one embodiment of the present invention.

The battery includes a bottomed prismatic battery case 6, and an electrode group 9 and an electrolyte (not shown) housed in the battery case 6. The electrode group 9 has a long negative electrode, a long positive electrode, and a separator interposed therebetween and preventing them from directly contacting with each other. The electrode group 9 is formed by winding the negative electrode, the positive electrode, and the separator around a flat plate-like winding core, and then removing the winding core.

In an exemplary structure of the lithium secondary battery an electrode group formed by winding the positive electrode and the negative electrode with the separator interposed therebetween is housed together with the electrolyte in an outer case. The wound-type electrode group may be replaced with a different form of the electrode group, for example, a stacked-type electrode group formed by stacking the positive electrode and the negative electrode with the separator interposed therebetween. The lithium secondary battery may be in any form, such as cylindrical type, prismatic type, coin type, button type, or laminate type.

A negative electrode lead 11 is attached at its one end to the negative electrode current collector of the negative electrode, by means of welding or the like. A positive electrode lead 14 is attached at its one end to the positive electrode current collector of the positive electrode, by means of welding or the like. The negative electrode lead 11 is electrically connected at its other end to a negative electrode terminal 13 disposed at a sealing plate 5. The positive electrode lead 14 is electrically connected at its other end to the battery case 6 serving as a positive electrode terminal. A resin frame member 4 is disposed on top of the electrode group 9, the frame member serving to insulate the electrode group 9 from the sealing plate 5, as well as to insulate the negative electrode lead 11 from the battery case 6. The opening of the battery case 6 is sealed with the sealing plate 5.

The lithium secondary battery may be charged at a voltage higher than 4.2 V. Even in the case of charging the battery with such a high voltage, while suppressing the dendrite deposition on the negative electrode, the deterioration of the positive electrode can be suppressed. Thus, excellent cycle characteristics can be obtained. The charge voltage may be 4.3 V or higher.

The present invention will be specifically described below with reference to Examples and Comparative Examples. It is to be noted, however, the present invention is not limited to the following Examples.

EXAMPLE 1

(1) Production of Positive Electrode

A lithium-nickel composite oxide ($LiNi_{0.8}Co_{0.18}Al_{0.02}O_2$), acetylene black, and polyvinylidene fluoride were mixed in a mass ratio of 95:2.5:2.5. The mixture was added with N-methyl-2-pyrrolidone (NMP), and then stirred in a mixer (T.K. HIVIS MIX, available from PRIMIX Corporation), to prepare a positive electrode slurry. Next, the positive electrode slurry was applied onto aluminum foil. The applied films were dried, and then rolled, to give a positive electrode (2 cm×4.5 cm) with a positive electrode mixture layer having a density of 3.6 g/cm$^3$ on both sides of the aluminum foil.

(2) Production of Negative Electrode

An electrolytic copper foil (thickness: 8 μm) was cut in an electrode size of 2.7 cm×7.7 cm, to form a negative electrode.

(3) Preparation of Electrolyte

FEC, EMC, and DMC were mixed at a volume ratio of FEC:EMC:DMC=20:5:75. In the obtained mixed solvent, 0.5 mat of LiFOB, 1 mass % of benzothiazole, and 1 mol/L of $LiPF_6$ were dissolved, to prepare an electrolyte.

(4) Production of Battery

A tab made of Al was attached to the positive electrode obtained above. A tab made of Ni was attached to the negative electrode obtained above. The positive electrode and the negative electrode were spirally wound together, with a polyethylene thin film (separator) interposed therebetween, in an inert gas atmosphere, to prepare a wound type electrode body. The obtained electrode body was housed in a bag-like package formed of a laminate sheet having an Al layer, into which the above electrolyte was injected. Then, the package was sealed, to form a lithium secondary battery T1.

EXAMPLE 2

A lithium secondary battery T2 was produced in the same manner as in Example 1, except that 2-methylbenzothiazole was added in place of the benzothiazole in the electrolyte prepared in (3).

COMPARATIVE EXAMPLE 1

A lithium secondary battery R1 was produced in the same manner as in Example 1, except that none of LiFOB and benzothiazole was added in the electrolyte prepared in (3).

COMPARATIVE EXAMPLE 2

A lithium secondary battery R2 was produced in the same manner as in Example 1, except that no benzothiazole was added in the electrolyte prepared in (3).

COMPARATIVE EXAMPLE 3

A lithium secondary battery R3 was produced in the same manner as in Example 1, except that thiazole was added in place of the benzothiazole in the electrolyte prepared in (3).

[Evaluation]

The obtained batteries T1 and T2 and batteries R1 to R3 were subjected to a charge-discharge test, to evaluate their charge-discharge characteristics.

In the charge-discharge test, the batteries were charged under the following conditions in a 25° C. a thermostatic oven. After allowed to stand for 20 min, the batteries were discharged under the following conditions.

(Charge)

A constant-current charge was performed at a current of 10 mA until the battery voltage reached 4.3 V, and then a constant-voltage charge was performed at a voltage of 4.3 V until the current value reached 1 mA.

(Discharge)

A constant-current discharge was performed at a current of 10 mA until the battery voltage reached 2.5 V.

A total of 40 cycles, each cycle consisting of the above charge and discharge, was performed as a charge-discharge test. A discharge capacity at the 20th cycle divided by a discharge capacity at the 1st cycle was determined as a capacity retention ratio $R_{20}$ (%), and a discharge capacity at the 40th cycle divided by the discharge capacity at the 1st cycle was determined as a capacity retention ratio $R_{40}$ (%). The evaluation results are shown in Table 1.

TABLE 1

| | Negative electrode | Oxalate salt (mass %) | Polycyclic thiazole compound (1) Benzothiazole (mass %) | Polycyclic thiazole compound (2) 2-methylbenzothiazole (mass %) | Thiazole (mass %) | Capacity retention ratio $R_{20}$ (%) | Capacity retention ratio $R_{40}$ (%) |
|---|---|---|---|---|---|---|---|
| T1 | Cu-current collector | 5 | 1 | 0 | 0 | 91.8 | 83.4 |
| T2 | Cu-current collector | 5 | 0 | 1 | 0 | 94.4 | 80.5 |
| R1 | Cu-current collector | 0 | 0 | 0 | 0 | 87.9 | 75.7 |
| R2 | Cu-current collector | 5 | 0 | 0 | 0 | 90.4 | 76.1 |
| R3 | Cu-current collector | 5 | 0 | 0 | 1 | 92.2 | 70.8 |

Example 3

A lithium secondary battery T3 was produced in the same manner as in Example 1, except that, in "(2) Production of negative electrode", a lithium foil (thickness: 300 μm) was cut in the predetermined electrode size, to form a negative electrode.

Comparative Example 4

A lithium secondary battery R4 was produced in the same manner as in Example 2, except that no benzothiazole was added in the electrolyte prepared in (3). The evaluation results are shown in Table 2.

TABLE 2

| | Negative electrode | Oxalate salt (mass %) | Polycyclic thiazole compound (1) (mass %) | Capacity retention ratio $R_{20}$ (%) | Capacity retention ratio $R_{40}$ (%) |
|---|---|---|---|---|---|
| T3 | Li-metal foil | 5 | 1 | 96.1 | 85.0 |
| R4 | Li-metal foil | 5 | 0 | 89.3 | 74.0 |

Table 1 shows that the batteries T1 and T2 are superior in cycle characteristics to the batteries R1 to R3. The battery T3 is also superior in cycle characteristics to the battery of R4. The evaluation results of the batteries T3 and R4 using a lithium foil as the negative electrode (Table 2) are much affected by the deterioration of the positive electrode. This shows that, in the battery T3, the deterioration of the positive electrode has been suppressed by the addition of a polycyclic thiazole compound.

INDUSTRIAL APPLICABILITY

The lithium secondary battery of the present invention is excellent in discharge capacity and cycle characteristics, and are suitably applicable for electric devices, such as cellular phones, smart phones, and tablet terminals, electric vehicles including hybrids and plug-in hybrids, and home storage battery systems combined with a solar cell.

REFERENCE SIGNS LIST 4 frame body
5 sealing plate
6 battery case
9 electrode group
11 negative electrode lead
13 negative electrode terminal
14 positive electrode lead

The invention claimed is:

1. A lithium secondary battery having a positive electrode, a separator, a negative electrode facing the positive electrode with the separator interposed between the negative electrode and the positive electrode, and an electrolyte, wherein
    the lithium secondary battery is configured to cause metallic lithium to deposit deposits on the negative electrode during charge, and to cause the metallic lithium to dissolve in the electrolyte during discharge,
    the positive electrode includes a positive electrode current collector, and a positive electrode mixture layer formed on a surface of the positive electrode current collector, the positive electrode mixture layer contains a nickel-containing composite oxide having a layered rock-salt structure, as a positive electrode active material,
    the electrolyte comprising:
        an oxalate salt containing an oxalate complex as an anion, and a lithium ion as a cation; and
        a polycyclic compound having a thiazole ring and an aromatic ring sharing one side with the thiazole ring,
        wherein the polycyclic compound is contained in an amount of 0.1 mass % or more and less than 5 mass % in the electrolyte,
    a mass ratio of the polycyclic compound to the oxalate salt is 0.02 or more and 0.2 or less in the electrolyte, and
    the electrolyte further comprises $LiPF_6$, wherein a ratio of the oxalate salt to a total of the oxalate salt and $LiPF_6$ is 20 mass % or more and 60 mass % or less.
2. The lithium secondary battery of claim 1, wherein the polycyclic compound includes at least one of a benzothiazole and a derivative thereof.
3. The lithium secondary battery of claim 1, wherein the oxalate salt includes lithium difluorooxalate borate.
4. The lithium secondary battery of claim 1, wherein
    the negative electrode includes a negative electrode current collector, and
    the negative electrode current collector includes a metal material that does not react with metallic lithium.
5. The lithium secondary battery of claim 4, wherein the metal material is copper or a copper alloy.

* * * * *